United States Patent
Kang

(10) Patent No.: US 7,349,715 B2
(45) Date of Patent: Mar. 25, 2008

(54) MOBILE COMMUNICATION TERMINAL FOR TRANSMITTING RANDOM ACCESS CHANNEL SIGNAL WITH VARIOUS TRANSMISSION POWER LEVELS AND METHOD THEREOF

(75) Inventor: Yoon-Sop Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 348 days.

(21) Appl. No.: 11/007,076

(22) Filed: Dec. 8, 2004

(65) Prior Publication Data
US 2005/0163086 A1 Jul. 28, 2005

(30) Foreign Application Priority Data
Jan. 15, 2004 (KR) .................... 10-2004-0003059

(51) Int. Cl.
*H04B 7/00* (2006.01)
(52) U.S. Cl. .................... 455/522; 455/69; 370/328
(58) Field of Classification Search ............. 455/522, 455/69; 370/328, 338
See application file for complete search history.

(56) References Cited
U.S. PATENT DOCUMENTS

| | | | | |
|---|---|---|---|---|
| 5,564,075 A | * | 10/1996 | Gourgue | ............ 455/69 |
| 5,806,003 A | * | 9/1998 | Jolma et al. | ............ 455/522 |
| 5,893,036 A | * | 4/1999 | Trandai et al. | ............ 455/522 |
| 6,434,130 B1 | * | 8/2002 | Soininen et al. | ............ 370/331 |
| 6,487,420 B1 | * | 11/2002 | Jonsson | ............ 455/522 |
| 7,043,212 B1 | * | 5/2006 | Mitjana | ............ 455/127.1 |

* cited by examiner

*Primary Examiner*—Matthew Anderson
*Assistant Examiner*—Angelica M. Perez
(74) *Attorney, Agent, or Firm*—The Farrell Law Firm, PC

(57) ABSTRACT

Disclosed is a mobile communication terminal that includes: a radio unit for receiving a broadcast control channel signal including cell information and transmitting a random access channel signal for a call allocation request to a corresponding cell; a reception power level measurement unit for measuring reception power levels of the broadcast control channel signal; a transmission power level calculation unit for calculating a transmission power level of the random access channel signal based on the measured reception power levels and the cell information; a key input unit for outputting a signal corresponding to network connection request by a user; and a controller for acquiring system information after synchronizing with a strongest broadcast control channel signal according to the measured reception power level, and controlling the random access channel signal for the call allocation request to be transmitted at the calculated transmission power level when the signal corresponding to the network connection request is input.

4 Claims, 2 Drawing Sheets

MOBILE COMMUNICATION TERMINAL FOR TRANSMITTING RANDOM ACCESS CHANNEL SIGNAL WITH VARIOUS TRANSMISSION POWER LEVELS AND METHOD THEREOF

PRIORITY

This application claims priority to an application entitled "Mobile Communication Terminal For Transmitting Random Access Channel Signal With Various Transmission Power Level And Method Thereof" filed in the Korean Intellectual Property Office on Jan. 15, 2004 and assigned Serial No. 2004-3059, the contents of which are incorporated herein by reference.

BACKGROUND OF THE INVENTION

1. Field of the Invention

The present invention relates to a mobile communication terminal, and more particularly a mobile communication terminal transmitting a random access channel (RACH) signal and a method thereof.

2. Description of the Related Art

Generally, each base station in a cell in a mobile communication network broadcasts a broadcast control channel signal to the mobile communication terminals by means of a broadcast control channel (BCCH). The BCCH is a downlink channel transmitted in a single direction in a point-to-multi point method and is a channel used for notifying the mobile communication terminals of general cell information. All mobile communication terminals are required to receive a BCCH signal before connecting to a mobile communication network. Conventional mobile communication terminals synchronize with the strongest BCCH signal received from base stations in each cell. Then, when a user makes a request for a network connection such as communication or data downloading, the conventional mobile communication terminals originate RACH signals and perform a call allocation request. The RACH is an uplink channel transmitted in a single direction and is a channel used for transmitting a message such as a response message to a call allocation request or question from a network.

When originating the RACH signals as described above, the conventional mobile communication terminals have always originated the RACH signals at the maximum power level regardless of their own positions. However, since the mobile communication terminals originate the RACH signals at the maximum power level, the power of terminals is unnecessarily consumed and the interference effect occurs in a mobile communication network.

SUMMARY OF THE INVENTION

Accordingly, the present invention has been made to solve at least the above-mentioned problems occurring in the prior art, and an object of the present invention is to provide a mobile communication terminal and a method, by which a proper transmission power level of a RACH signal is calculated according to a position of the mobile communication terminal in a cell, and the RACH signal is transmitted at the calculated transmission power level instead of at a maximum power level.

In order to accomplish the aforementioned object, according to one aspect of the present, there is provided a mobile communication terminal including a radio unit for receiving a broadcast control channel signal including cell information and transmitting a random access channel signal for a call allocation request to a corresponding cell; a reception power level measurement unit for measuring reception power levels of the broadcast control channel signal received in the radio unit; a transmission power level calculation unit for calculating a transmission power level of the random access channel signal by means of the measured reception power levels and the cell information contained in the broadcast control channel signal; a key input unit for outputting a signal corresponding to a network connection request by a user; and a controller for acquiring system information of the corresponding cell after synchronizing with a strongest broadcast control channel signal according to the measured reception power level, and controlling the random access channel signal for a call allocation request to be transmitted at the calculated transmission power level when the signal corresponding to the network connection request is input.

In order to accomplish the aforementioned object, according to one aspect of the present, there is provided a method for transmitting a random access signal at various transmission power levels by a mobile communication terminal, the method including the steps of receiving broadcast control channel signals and measuring reception power levels of the broadcast control channel signals; synchronizing with a broadcast control channel signal having a highest power level from among the measured reception power levels; acquiring system information related to a corresponding cell from the synchronized broadcast control channel signal; calculating a transmission power level value of the random access channel signal for a call allocation request based on the measured reception power levels and the acquired cell information when a the mobile communication terminal requests a network connection; and transmitting the random access channel signal at the calculated transmission power level.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may obscure the subject matter of the present invention.

Figure 1:
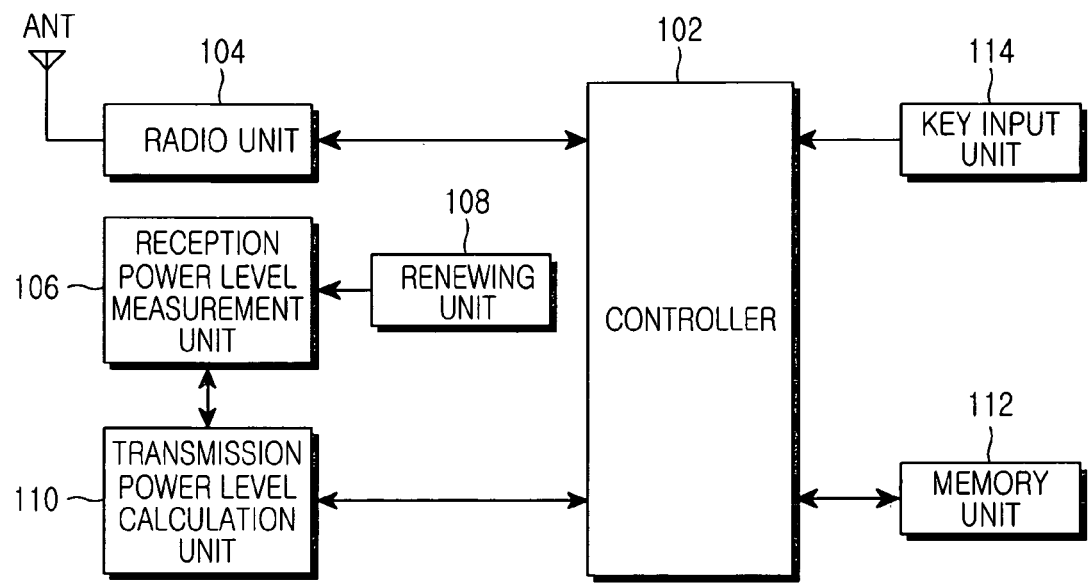
FIG. 1 is a block diagram of a mobile communication terminal according to an embodiment of the present invention.

FIG. 1 is a block diagram of a mobile communication terminal according to an embodiment of the present invention. Referring to FIG. 1, the mobile communication terminal according to the embodiment of the present invention includes a controller 102, a radio unit 104, a reception power level measurement unit 106, a renewing unit 108, a transmission power level calculation unit 110, a memory unit 112, and a key input unit 114.

The controller 102 performs a general control operation for the mobile communication terminal. When the mobile communication terminal is powered on, the controller 102 measures reception power levels of a BCCH signal, synchronizes with the strongest BCCH signal, and acquires system information of a corresponding cell. Also, when a network connection request signal for communication or data downloading is input to the mobile communication terminal, the controller 102 calculates an RACH transmission power level based on the reception power levels of the BCCH signal and reception characteristic information of the cell contained in the system information, and performs a control operation necessary for transmitting a RACH signal having the calculated transmission power level.

The radio unit 104 receives the BCCH signal broadcast from an external base station and transmits the RACH signal for a call allocation request to a base station in a corresponding cell.

The reception power level measurement unit 106 measures the power levels of the BCCH signal received in the radio unit 104. The renewing unit 108 may include a timer, etc., and instructs the reception power level measurement unit 106 to measure the power levels of the BCCH signal, received in the radio unit 104, after each predetermined time period (e.g., 5 seconds).

The transmission power level calculation unit 110 receives the power levels of the BCCH signal measured by the reception power level measurement unit 106, receives the reception characteristic information contained in the system information, and calculates the transmission power level of the RACH signal for the call allocation request.

The memory unit 112 stores the calculated transmission power level of the RACH signal.

The key input unit 114 includes keys to enable entry of to a request for communication or data downloading and outputs a network connection request signal when a user presses the key corresponding to the request for communication or data downloading.

Figure 2:
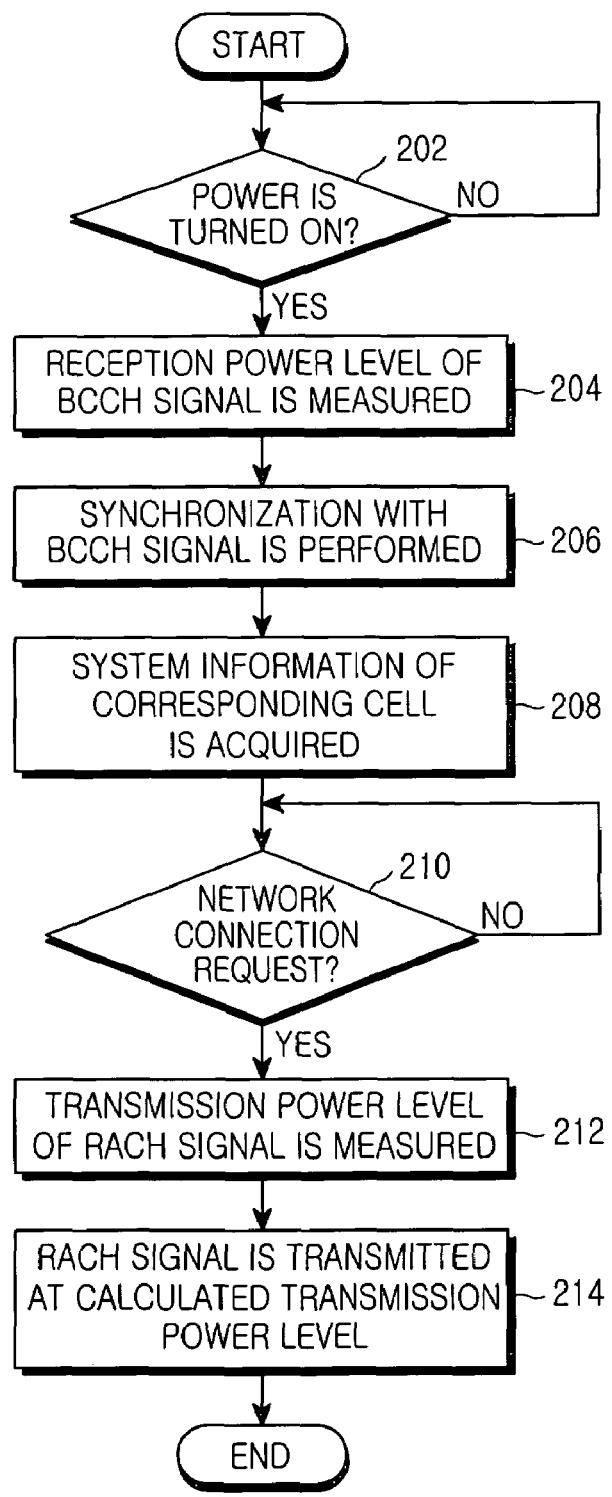
FIG. 2 is a flowchart illustrating an originating process of an RACH signal by a mobile communication terminal according to an embodiment of the present invention.

FIG. 2 is a flowchart illustrating an originating process of an RACH signal by a mobile communication terminal according to an embodiment of the present invention. The originating process of the RACH signal by the mobile communication terminal will be described in detail with reference to FIGS. 1 and 2.

When the mobile communication terminal is powered on in step 202, step 204 is performed. Even when the mobile communication terminal moves into a certain cell, step 204 may be performed. In step 204, the mobile communication terminal measures the reception power levels of a BCCH signal received through the radio unit 104. Then, in step 206, the mobile communication terminal synchronizes with the BCCH signal corresponding to the strongest power level from among the measured reception power levels of the BCCH signal. Then, in step 208, the mobile communication terminal acquires the system information of a corresponding cell from the BCCH signal with which the mobile communication terminal has synchronized. The system information includes reception characteristic information of the corresponding cell.

As described above, after the power levels of the BCCH signal and the reception characteristic information the corresponding cell are obtained, the mobile communication terminal determines whether a network connection request exists or not in step 210 and if a network connection request exists, step 220 is performed and if not, the mobile communication terminal waits for the network connection request. For instance, when a user requests a communication link or a data downloading process, step 212 is performed. The mobile communication terminal calculates the transmission power level of a RACH signal, which is to be transmitted for a call allocation request, by means of the reception power levels of the BCCH signal and the reception characteristic information of the cell contained in the system information.

For example, the mobile communication terminal calculates the transmission power level of the RACH signal by means of the following Equation (1).

$$RACH \text{ transmission power level } (Ptx) = \min\{ra-rb-(C+48), PMAX\} \quad (1)$$

This equation is disclosed in an output power section (10.2.1) of a mobile communication terminal of a GPRS (General Packet Radio Service) 505.08 series.

In this equation, ra is a maximum transmission power level of the mobile communication terminal. In the case of a mobile communication terminal employing a GSM400 (Global System for Mobile communications), a GSM900, or a GSM850 method in a GPRS specification, ra is defined to have a value of 39 dBm. In the case of a mobile communication terminal employing a DCS1800 (Digital Cellular Service) or a DCS1900 method, ra is defined to have a value of 36 dBm.

rb is the reception characteristic level of the cell contained in the system information of the acquired corresponding cell, is defined in the GPRS specification 04.60, and has a value between 0 dBm and 62 dBm. An example of the rb value used herein is 40 dBm which is an experimental value.

C is the reception power level of the BCCH signal of a main cell measured in the mobile communication terminal. For example, C has a value of −50 dBm to −110 dBm. PMAX is a permissible maximum output power level of the cell shown in a GSM specification. Accordingly, the GSM has a value of 33 dBm and the DCS has a value of 30 dBm.

When solving the aforementioned equation in detail by means of the values as described above, in the case of the GSM, Ptx becomes min {39−40−(C+48), 33}, that is, (−C−49, 33). Further, in the case of the DCS, Ptx becomes min {36−40−(C+48), 30}, that is, (−C−52, 30).

In this way, the mobile communication terminal calculates the transmission power level of the RACH signal. Then, in step 214, the mobile communication terminal transmits the RACH signal at the calculated transmission power level. Accordingly, a mobile communication terminal according to the present invention does not transmit a RACH signal for a call allocation request at a maximum power level. Instead, the mobile communication terminal can transmit the RACH signal at a proper power level according to the position of the terminal in a cell.

A mobile communication terminal according to the present invention calculates a proper transmission power level of a RACH signal according to its own position in a cell, and transmits the RACH signal at the calculated transmission power level instead of a maximum power level. Accordingly, according to the present invention, when a RACH signal is transmitted, the power consumption of the terminal can be reduced and the interference effect of a mobile communication network can be prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal, comprising:
a radio unit for receiving a broadcast control channel signal that includes cell information and transmitting a random access channel signal for a call allocation request;
a reception power level measurement unit for measuring reception power levels of the broadcast control channel signal received in the radio unit;
a transmission power level calculation unit for calculating a transmission power level of the random access channel signal based on the measured reception power levels and the cell information;
a key input unit for outputting a signal corresponding to a network connection request by a user; and
a controller for acquiring system information after synchronizing with a strongest broadcast control channel signal according to the measured reception power level, and controlling the random access channel signal for the call allocation request to be transmitted at the calculated transmission power level when the signal corresponding to the network connection request is input,
wherein the transmission power level (Ptx) of the random access channel signal is calculated by, $$Ptx = \min\{ra - rb - (C + 48), PMAX\}$$

wherein ra is a maximum transmission power level of the mobile communication terminal, rb is a reception characteristic level of the cell contained in the system information of the acquired corresponding cell, C is a measured reception power level of the broadcast control channel signal, and PMAX is a permissible maximum output power level of the cell.

2. The mobile communication terminal as claimed in claim 1, further comprising a renewing unit for controlling the reception power level measurement unit to measure the power levels of the broadcast control channel signal after each predetermined time period.

3. The mobile communication terminal as claimed in claim 1, further comprising a storage unit for storing the calculated transmission power level of the random access channel signal.

4. A method for transmitting a random access signal at various transmission power levels by a mobile communication terminal, the method comprising the steps of:
receiving broadcast control channel signals and measuring reception power levels of the broadcast control channel signals;
synchronizing with a broadcast control channel signal having a highest power level from among the measured reception power levels;
acquiring system information of a corresponding cell from the synchronized broadcast control channel signal;
calculating a transmission power level value of the random access channel signal for a call allocation request by means of the measured reception power levels and the acquired cell information when a user requests a network connection; and
transmitting the random access channel signal at the calculated transmission power level,
wherein the transmission power level (Ptx) of the random access channel signal is calculated by, $$Ptx + \min\{ra - rb - (C + 48), PMAX\}$$

wherein ra is a maximum transmission power level of the mobile communication terminal, rb is a reception characteristic level of the cell contained in the system information of the acquired corresponding cell, C is a measured reception power level of the broadcast control channel signal, and PMAX is a permissible maximum output power level of the cell.

* * * * *